United States Patent
Henshaw (10) Patent No.: US 7,716,231 B2
(45) Date of Patent: May 11, 2010

(54) SYSTEM AND METHOD FOR GENERATING SUGGESTED ALTERNATIVES FOR VISUAL OR AUDIBLE SUBMISSIONS

(75) Inventor: Jeffrey D. Henshaw, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1366 days.

(21) Appl. No.: 10/985,121

(22) Filed: Nov. 10, 2004

(65) Prior Publication Data

US 2006/0101342 A1  May 11, 2006

(51) Int. Cl.
G06F 17/30 (2006.01)
G06F 7/00 (2006.01)
(52) U.S. Cl. ...................................... 707/758
(58) Field of Classification Search ............... 707/104.1
See application file for complete search history.

(56) References Cited

U.S. PATENT DOCUMENTS

| 6,341,292 B1* | 1/2002 | Cho et al. ................. 707/203 |
| 6,546,427 B1* | 4/2003 | Ehrlich et al. ............. 709/231 |
| 2001/0042048 A1* | 11/2001 | Boykin et al. ............ 705/51 |
| 2002/0124182 A1* | 9/2002 | Bacso et al. .............. 713/200 |
| 2002/0169760 A1* | 11/2002 | Cheung et al. ............ 707/3 |
| 2003/0061278 A1* | 3/2003 | Agarwalla et al. ........ 709/203 |
| 2003/0219708 A1* | 11/2003 | Janevski et al. .......... 434/350 |
| 2004/0049579 A1* | 3/2004 | Ims et al. ................. 709/225 |
| 2004/0081110 A1* | 4/2004 | Koskimies ............... 370/315 |
| 2004/0133848 A1* | 7/2004 | Hunt et al. ............... 715/500 |
| 2004/0168121 A1* | 8/2004 | Matz ....................... 715/513 |
| 2004/0216170 A1* | 10/2004 | Rashkovskiy et al. ..... 725/135 |

FOREIGN PATENT DOCUMENTS

WO    WO 03/019406 A2    3/2003

OTHER PUBLICATIONS

Adobe Photoshop 6.0 Online Manual, 2000, *Adobe Systems, Inc.*, 9 pages.
"Output Alternatives: ImageReady & Pre-5.5; exporting files for the web using ImageReady," *Stanford University*, 2004, retrieved from the Internet: http://med.stanford.edu/irt/web/training/photoshop1/altoutput1.html, retrieved 2005, 2 pages.

* cited by examiner

*Primary Examiner*—Kuen S Lu
(74) *Attorney, Agent, or Firm*—Woodcock Washburn LLP (57) ABSTRACT

Alternative representations are generated from a user's audible or visual data submission (e.g., user's picture) for use as part of an online account profile or user identification in an online service (e.g., online gaming user profile) or computer device. A specific representation is selected for use with the online account or computing device. Furthermore, a specific representation of the user's audible or visual data that is suitable for a particular display device (e.g., television, cellular telephone) can be generated and presented.

11 Claims, 8 Drawing Sheets

SYSTEM AND METHOD FOR GENERATING SUGGESTED ALTERNATIVES FOR VISUAL OR AUDIBLE SUBMISSIONS

FIELD OF THE INVENTION

The present invention is directed to user identification for computing devices, and more particularly, to visual or audible alternatives for user accounts.

BACKGROUND OF THE INVENTION

As online services that require account names or "User IDs" become more and more populated with user communities, the number of names readily available for user selection dwindles. Early in an online service's life cycle, one might be able to request the name "Bill" and actually have that name issued to them. On an older or more populated service, someone requesting the name "Bill" will likely find that name is already taken, and be offered a number of system-generated alternative selections, like "Bill________" or "Bill060675" or "Wild_William."

New online services and computer systems are being created that rely increasingly upon unique user identifying marques that include not just text display names, but upon photos, 3D models, and eventually small audio or video clips.

In cases where such richer media is used by a user to identify oneself, exclusivity is rarely a concern because photographs, audio and video clips tend to be unique by their nature. Richer media does, however, present a challenge in how it is presented to users. For example, photographs tend to display much better on higher resolution computer monitors than they do on lower-resolution (e.g., NTSC) television sets.

When online services and systems are consumed via a range of devices (e.g., televisions, cellular phones, PCs, personal digital assistants, etc.) and make use of richer media for personal identification, the problem arises of how to display the uniquely identifying media such that it looks and/or sounds best.

Previous online service offerings have supported some forms of richer media for personal identity. MSN Messenger is an example wherein a 96×96 pixel picture can be added to one's personal profile. This poses some limitations and demands upon users to get a good-looking picture representation. For example, if a user submits a large photo, MSN Messenger's smaller 96×96 pixel representation of that picture is generally unrecognizable. The picture is distorted to the point of being unrecognizable as the application system scaled, skewed, downsized, decolorized, and otherwise distorted it. The end result can be displeasing for customers.

The concept of image alternatives in itself is not new. Photo editing applications like Adobe Photoshop have offered users "thumbnail previews" of various image filters. However, such alternative representations have been conventionally been used for editing purposes.

An effective and efficient system and method for generating alternatives into an online system or computer system for managing and customizing accounts eludes those skilled in the art.

SUMMARY OF THE INVENTION

The present invention is directed to generating alternative representations of a user's audible or visual data for use as part of an online account profile or user identification in an online service or computer system. An audible or visual data submission is provided to the computing device by a user account. The computing device analyzes the data submission and generates alternatives for selection. The computing device outputs the alternatives for user account selection. At least one specific representation is selected by the user for use with the online account or system. According to aspects of the invention, a specific representation of the user's audible or visual data can be generated and/or suggested that is suitable for a particular display device.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Exemplary Computing Environment

Figure 1:
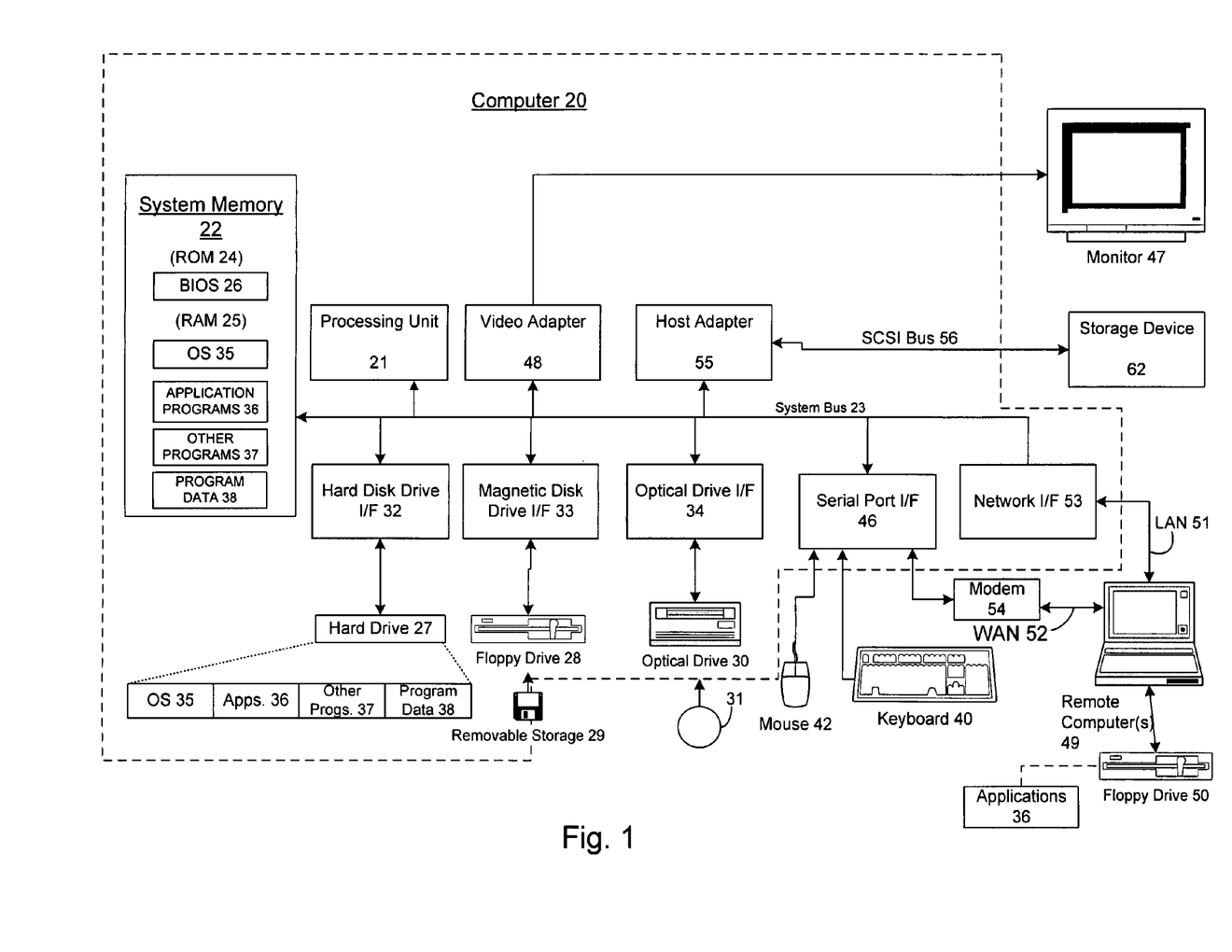
FIG. 1 is a block diagram representing a computer system in which aspects of the present invention may be incorporated.

Numerous embodiments of the present invention may execute on a computer. FIG. 1 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Exemplary Embodiments

Figure 2:
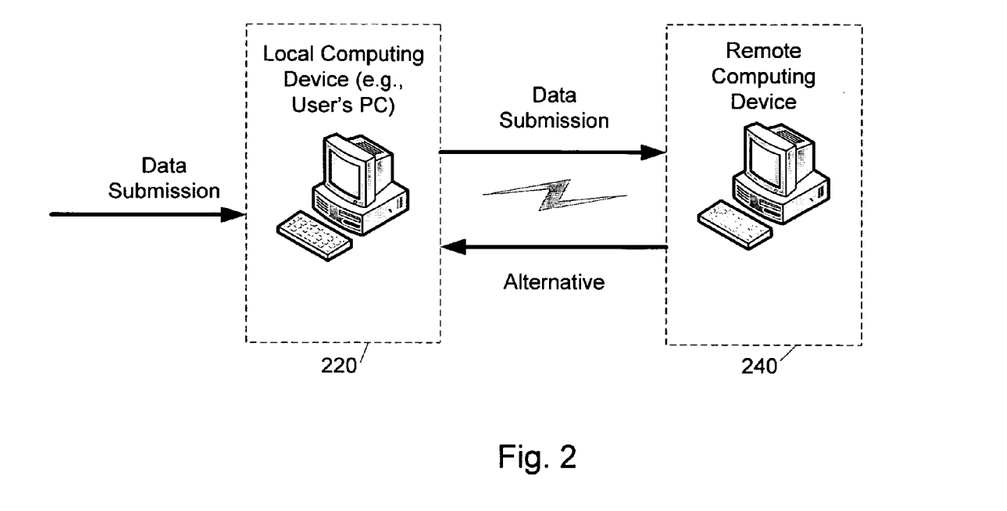
FIG. 2 is a block diagram representing an exemplary local computing device interacting with a remote computing device or online service in accordance with the present invention.

FIG. 2 is a block diagram representing an exemplary local computing device 220 interacting with a remote computing device 240. The remote computing device 240 may be an online service, for example. FIG. 2 depicts a data submission provided (e.g., via a user, an input device, or another computing device) into the local computing device 220, which may be a personal computer, for example. An exemplary data submission may be a picture file, a video file, an audio file, a multimedia file, or any other type of data file, for example. The data submission may be in any format, such as .jpg, .mpeg, .wav, for example.

The data submission is then transmitted or otherwise provided or outputted from the local computing device 220 to the remote computing device 240, via a cable, the Internet, or other communications network for example, for processing. After the remote computing device 240 receives the data submission, the remote computing device 240 desirably processes the data submission and generates at least one alternative. These alternatives are based on the originally received data submission, and may be generated by any appropriate algorithm, technique, or application. Exemplary techniques for generating alternatives include, but are not limited to, regional clipping to a subset resolution, scaling with multiple axis skew, and key region detection. Such techniques are described further herein.

The remote computing device 240 then transmits or otherwise provides the alternatives to the local computing device 220. The alternatives may then be displayed, played, or otherwise provided to a user for selection, for example. The selected alternative(s) may then be associated with an account and/or computing device that is established for, or associated with, the user, for example.

It is contemplated that the alternative(s) may be generated locally at the local computing device 220, rather than being generated remotely. A selection of at least one alternative may be made at the local computing device 220, and the remote computing device 240 may then be advised of the selection(s) and/or provided with the selection(s).

Figure 3:
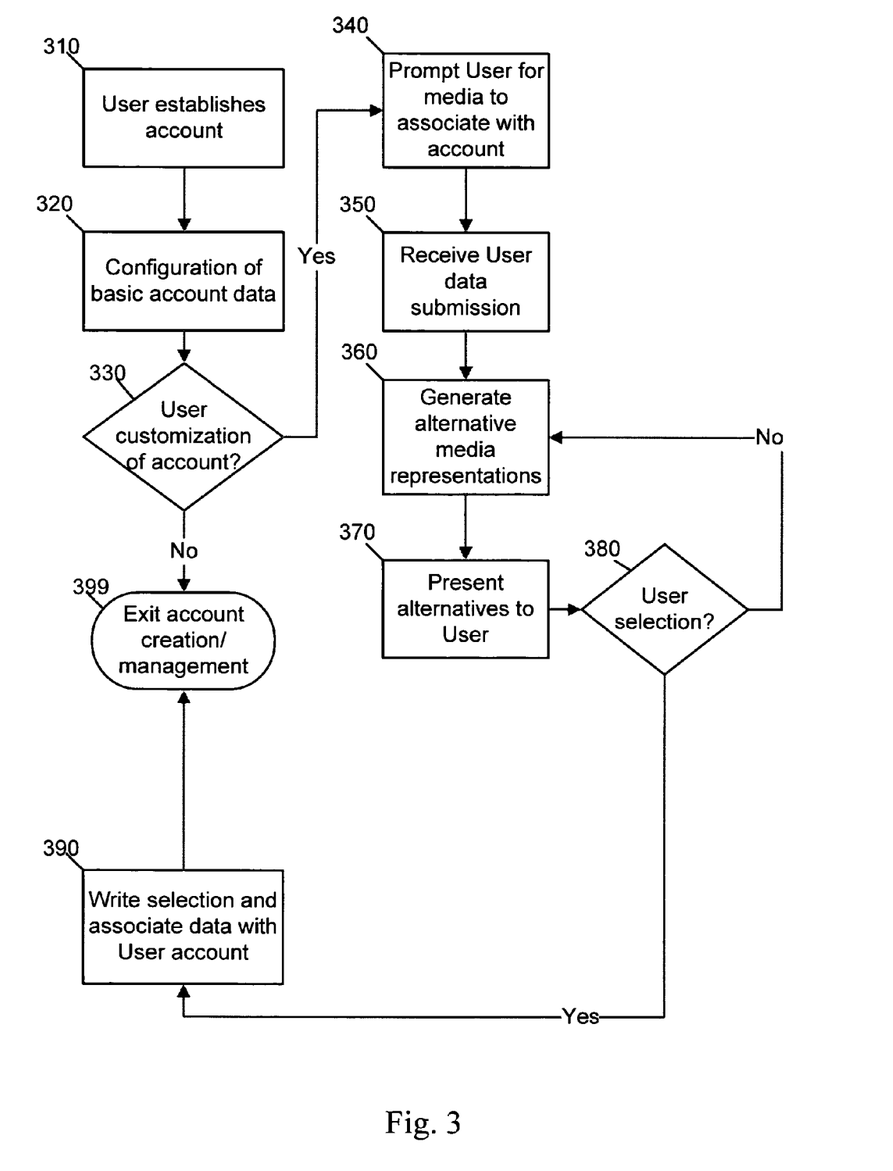
FIG. 3 is a flow diagram of an exemplary method for generating alternatives from a data submission in accordance with the present invention.

FIG. 3 is a flow diagram of an exemplary method for generating suggested alternatives from a visual or audible data submission. The exemplary method may be employed when a user desires to attach a visual or audible data submission for account association, for example. At step 310, the user initializes the program and establishes an account (e.g., establishes an account with an online service such as msn.com). At step 320, the user desirably configures the account by either selecting or inputting account data, perhaps pursuant to prompts or a wizard, for example, provided either locally or remotely (e.g., from the online service or other remote computing device).

At step 330, the user may be asked whether he wishes to customize the user account, e.g., by associating a data submission with the account. If the user wishes not to customize the account at step 330, then at step 399, the account may be saved with any changes made by the user, for example, and the program is exited.

If, however, the user wishes to customize the account, then at step 340, the program (or processor, or other processing software or hardware, for example) desirably prompts the user for either audible or visual media, for example, to associate with the user account. At step 350, the data submission is received (e.g., by user input), and alternative media representations are generated at step 360.

The alternative media representations are desirably presented to the user at step 370 for selection. Such presentation can take the form of a visual display and/or audio playback, for example. If the user decides to use one or more of the alternative media representations at step 380, the user may select the alternative media representation(s) and the account is updated with the new media selection at step 390. The changes are preferably saved with the changes made by the user for example, and processing is exited at step 399.

If the user decides not to use the alternative media representations provided at step 370, processing may continue at step 360 with a new set of alternatives being generated and presented.

Figure 4A:
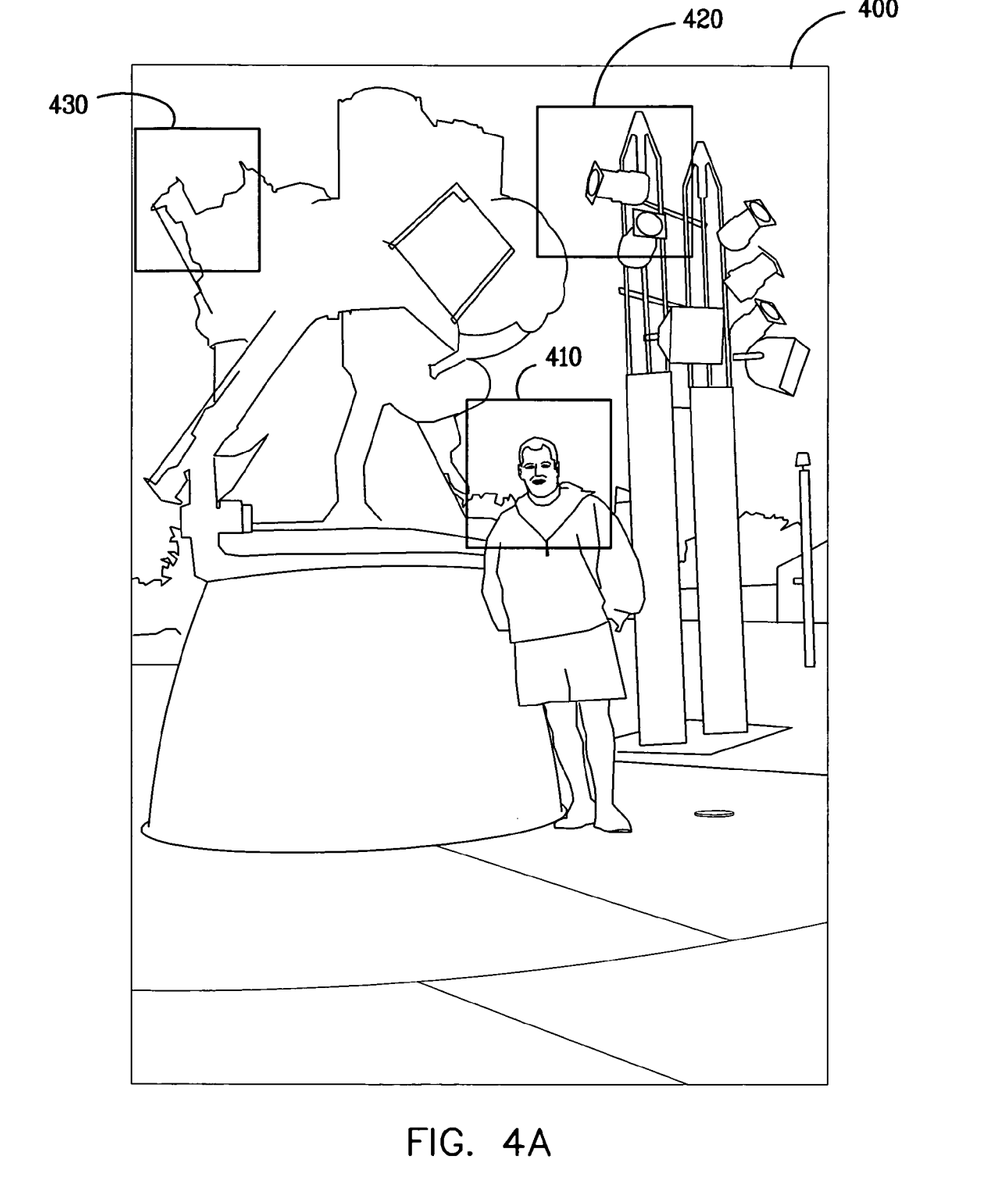
FIG. 4A is a symbolic representation of exemplary alternative media representations generated responsive to a data submission in accordance with the present invention.
Figure 4B:
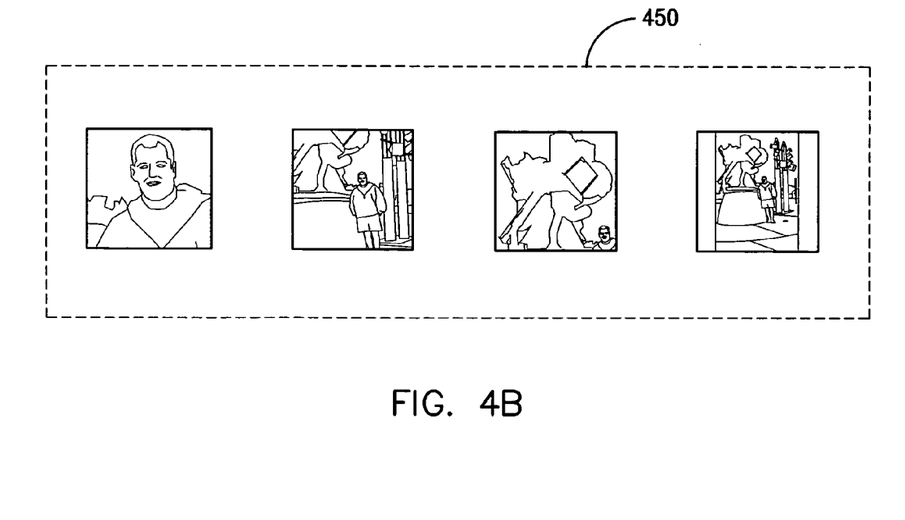
FIG. 4B is a symbolic representation of further exemplary alternative media representations generated responsive to a data submission in accordance with the present invention.

FIGS. 4A and 4B show symbolic representations of exemplary alternative media representations that may be generated based on a data submission in accordance with the present invention. With respect to FIG. 4A, a data submission 400 is received from the user and at least one alternative 410, 420, 430 is generated for user selection. For example, as shown, the data submission may be a data file representing a photograph or other type of picture or image. Alternatively, the data submission may be a video file, an audio file, a multimedia file, or any other type of data file, for example. A processor then generates alternatives based on the data submission, as described further herein. The process may generate alternatives using head-shape region detection, for example.

As shown in FIG. 4A, for example, a data submission 400 represents a photograph. It is noted that the photograph comprises various images, such as an image of a man, along with various objects, as well as a background (e.g., sky) and a foreground (e.g., ground). If this picture were merely used, as submitted, to represent the user account, it is likely that the items in the picture would be unrecognizable (and thus undesirable) as the picture is scaled to the display device (e.g., the display device of a personal digital assistant, telephone, or online display, such as a small icon or display area). Thus, preferably, various portions of the original data submission 400 are used as alternatives that are presented to the user for subsequent selection.

As shown in FIG. 4A, three alternatives 410, 420, 430 are generated for subsequent presentation and selection by the user. Here, the user may desire to choose alternative 410, which is a profile image of a man, instead of the alternatives 420 and 430, which represent a rocket motor and a lighting unit, respectively. Alternatives may have derived using head-shape region detection, for example. In this manner, the user account may be represented by a selected (and e.g., more appropriate, more desirable, and/or more recognizable) alternative. Additional alternatives 450 are shown in FIG. 4B. These alternatives 450 may be presented at the same time to the user, or sequentially, for example. Moreover, these alternatives may be presented to the user if the user finds previously presented alternatives (e.g., alternatives 410, 420, 430) undesirable.

As noted above, exemplary techniques for generating alternatives include, but are not limited to, regional clipping to a subset resolution, scaling with multiple axis skew, and key region detection. Generally, regional clipping may be used when an original photo is larger than what can be displayed on a device (for example, a television or monitor) without severely shrinking the image. Scaling or shrinking the image may cause distortion to a degree that renders the picture unusable or otherwise undesirable. By detecting the target resolution, for example, of a display device (e.g., post-interlaced resolution is 320×240 pixels), and then comparing the resolution to the original image that may be composed of, for example, 720×480 pixels, a system may perform a basic mapping of a smaller region and essentially create new images from portions of the original.

Another exemplary algorithm uses the technique of scaling with multiple axis skew that involves scaling, or resizing the media for better output. Often times, this scaling can cause distortion due to mismatched height and width dimensions between the source and target media. Further, when scaling the larger of the two axes and the smaller axis remains proportional to the larger, one gets borders or "grout" around the image. To solve this issue, another alternative may be applied in the scale, for example, which is commonly known as a photo fill, wherein the original image is scaled down to the smaller axis—in this case width—with the remaining cropped away.

Additionally, some high-end applications use key region detection. A system may employ a more advanced algorithm for detecting key regions in either visual or audible media. In an audible media submission, for example, key peaks and troughs in the audio wave itself may be culled out and offered as alternatives. In visual media submission, for example, bright or dark regions may be detected and used as center points for derived alternative images. Advanced key region detection systems may determine, for example, high-contrast regions and using shape recognition software, pick out a person's face within a visual media.

A target rendering medium is, for example, an output device or viewing device of media. An exemplary target rendering medium may be, but is not limited to, a television, a computer monitor, a cellular telephone, a personal digital assistant, a gaming console, a multimedia console, speakers, or other display, playback, or output devices. Different target rendering media may have different output formats and resolutions, for example. Accordingly, some alternatives generated from a data submission may be more suitable or desirable for presentation on a particular target rendering medium, while other alternatives may be more suitable or desirable for presentation on another target rendering medium. It is desirable to provide at least one alternative that is appropriate for a particular target rendering medium.

Figure 5:
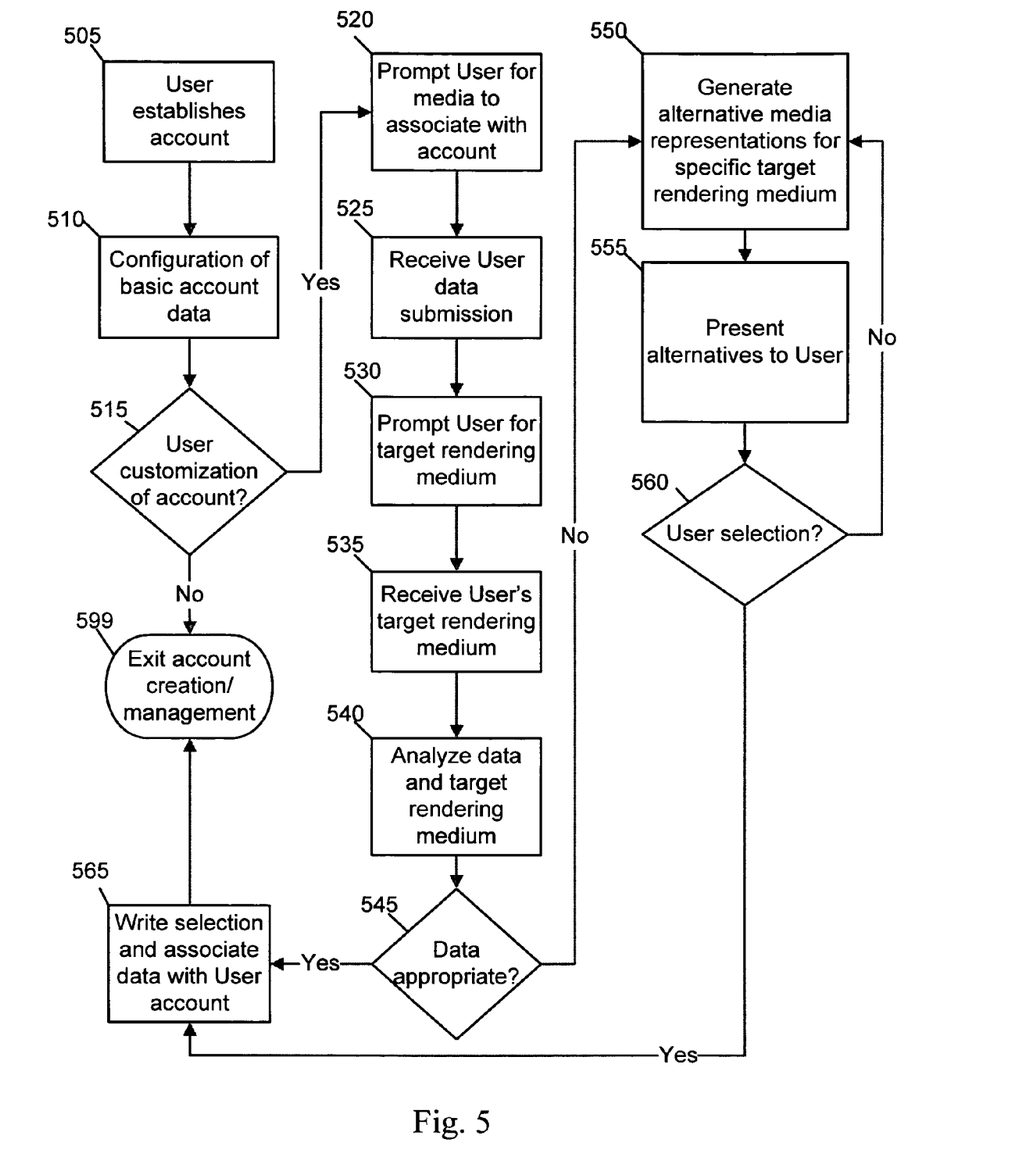
FIG. 5 is a flow diagram of an exemplary method of generating specific alternatives from a data submission for a specific target rendering medium in accordance with the present invention.

FIG. 5 is a flow diagram of an exemplary method of generating specific alternatives from a data submission for a specific target rendering medium from a visual or audible data submission, though it is contemplated that any type of data file may be used as a data submission. It is further contemplated that alternatives may be generated and presently concurrently or sequentially, for example, for one or more potential target rendering media. Steps 505, 510, and 515 correspond to steps 310, 320, 330, as described above, and their descriptions are omitted for brevity. If the user wishes not to customize the account at step 515, then at step 599, the account is desirably saved with any changes and the program is exited.

If, however, the user wishes to customize the account at step 515, then at step 520, the program prompts the user for data, such as audible or visual media, to associate with the user account. At step 525, the program receives the data submission (e.g., by user input). At step 530, the program prompts the user for the target rendering medium (or media, for example) and at step 535, the program receives user's selection for the target rendering medium.

Upon receipt of the target rendering medium at step 535, the program (or underlying or associated processor, for example) analyzes the data submission at step 540 to determine if the data submission is appropriate for the target rendering medium. A data submission may not be appropriate if the resolution, for example, or capabilities of the target rendering medium are not sufficient to suitably display, play, broadcast, or otherwise output or present the data submission (e.g., with appropriate or desired clarity). For example, assume a visual data submission may have a very high fidelity (e.g., a multi-megapixel photograph), and the target rendering medium (e.g., a cellular telephone display) is incapable of displaying the data submission without a high degree of distortion. In such a case, the data submission may be considered inappropriate for the target rendering medium. Such appropriateness may be determined by comparing resolution and/or size, for example, between the data submission and the target rendering medium.

If the data submission is determined to be appropriate for the target rendering medium at step 545, then the account is updated with the new media selection at step 565, and the changes are saved, and the program is exited in step 599.

If the data submission is not appropriate to use with the target rendering medium, as determined at step 545, then one or more alternative media representations are generated at step 550. These alternatives may be generated using exemplary techniques described herein, for example. It is contemplated that these alternative media representations may be generated for one or more target rendering media, such that, for example, one or more alternatives are generated for a first target rendering medium and at least one other alternative is generated for a second target rendering medium.

The alternative media representations are desirably presented to the user at step 555 for consideration and subsequent selection. If the user decides to use one or more of the alternative media representation 560 (e.g., for various target rendering media), the user may select the alternative media representation(s), the account is updated with the new media selection in step 565, the changes are saved, and the program is exited in step 599. If the user decides not to use the alternative media representations 560, processing desirably continues at step 550 with additional alternatives being generated and presented for consideration and subsequent selection. The user may then select from a new set of generated alternatives.

Figure 6:
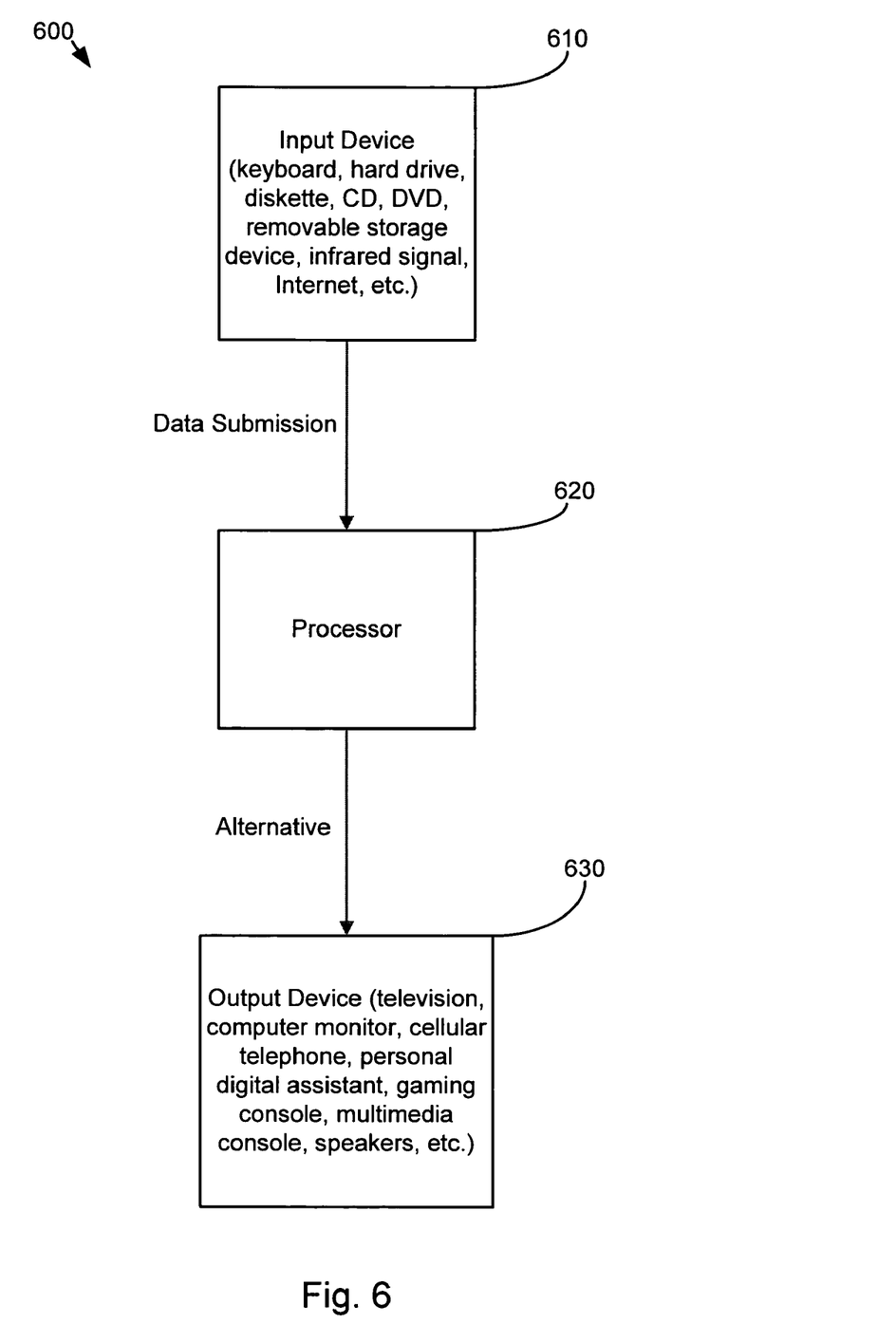
FIG. 6 is a block diagram of an exemplary system for generating alternatives from a data submission in accordance with the present invention.

FIG. 6 is a block diagram of an exemplary system 600 for generating alternatives from a data submission in accordance with the present invention. The system 600 comprises an input device 610 that receives the data submission from a user or user account, either directly or indirectly. The input device 610 may include a keyboard, a hard disk drive, a diskette, a compact disk (CD), a digital video disk (DVD), a removable storage device, an infrared signal, the Internet, or other input devices, for example.

The data submission is provided from the input device 610 to the processor 620. The processor 620 creates alternatives from the data submission. The processor 620 then provides the alternative(s) to an output device 630 for presentation to a user. The output device 630 may include a television, a computer monitor, a cellular telephone, a personal digital assistant, a gaming console, a multimedia console, speakers, or other output devices. In this manner, a user may view, listen to, or otherwise consider, and subsequently select, one or more alternatives to be associated with the account.

A user may desire viewing, listening to, or otherwise considering, alternatives from a data submission as they would be heard or displayed or otherwise outputted or presented on a target rendering medium before associating the alternative with the account which in turn would lead to outputting the alternative on the target rendering medium. A visual image, for example, displayed on a cellular telephone may not look like the same visual image displayed on a computer screen. Thus, a user may wish to have the image on the computer screen, for example, distorted or resized sufficiently to simulate how the same visual image may look on a device with a lesser fidelity.

Figure 7:
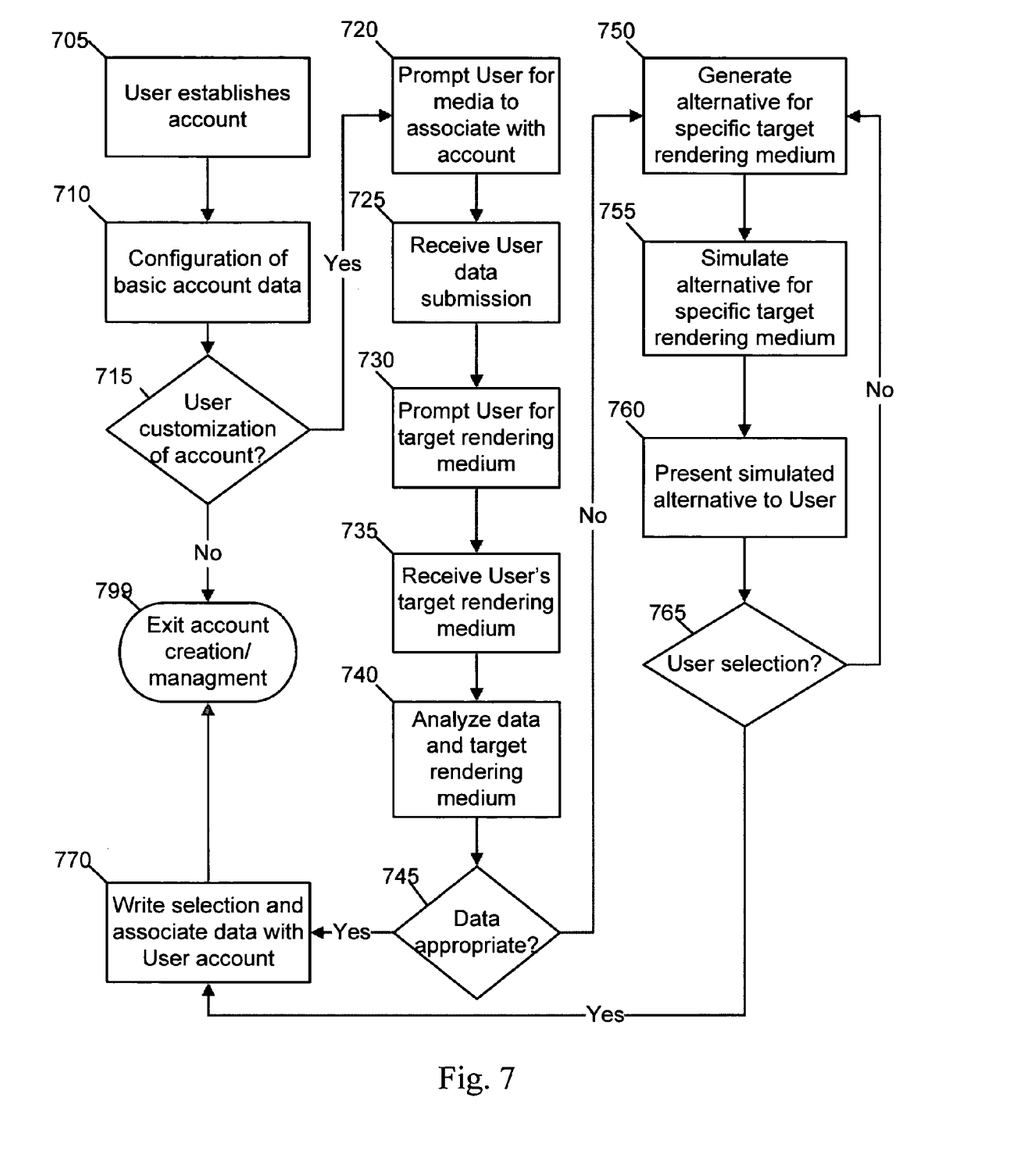
FIG. 7 is a flow diagram of an exemplary method of simulating specific alternatives from a data submission for a specific target rendering medium in accordance with the present invention.

FIG. 7 is a flow diagram of an exemplary method of simulating specific alternatives from a data submission for a specific target rendering medium from a visual or audible data submission. Steps 705, 710, and 715 correspond to steps 310, 320, 330, as described above, and their descriptions are omitted for brevity. If the user wishes not to customize the account at step 715, then at step 799, the account is saved and the program is exited.

If, however, the user wishes to customize the account 715, then processing continues from steps 720 to 745 similar to steps 520 to 545, described above. The description of steps 720-745 is thus omitted for brevity.

If the data submission is appropriate in step 745, then the account is updated with the new media selection in step 770, the changes are saved, and the program is exited in step 799.

If the data submission is not appropriate to use with the target rendering medium, then alternative media representations are generated at step 750. The generated alternatives for the specific target rendering medium are then used to simulate the alternatives (e.g., visual and/or audible alternatives) for the specific target rendering medium at step 755. The simulation at step 755 may include distorting the visual or audible alternatives created at 750 to indicate to the user what the visual or audible data, for example, may look or sound like on a specific target rendering medium.

The simulated alternative media representations are presented to the user at step 760 for selection. If the user decides to use an alternative media representation at step 765, the user selects the alternative media representation, the account is updated with the new media selection at step 770, the changes are saved, and the program is exited in step 799. If the user decides not to use the alternative media representations at step 765, processing desirably continues at step 750 with additional alternatives being generated, simulated, and presented to the user for subsequent consideration and selection.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A computer-implemented method for generating user identification information, comprising:

receiving at a server a data submission, the data submission for user identification associated with a user account and comprising one of a video file, an audio file, a multimedia file, and a picture file that is employed to generate at least one of a visual or audible output that identifies the user account;

determining at the server at least one alternative data item for user identification associated with the user account, the alternative data item based on the data submission and employed to generate at least one of a visual or audible output that identifies the user account;

outputting the at least one alternative data item;

receiving an indication of a selected one of the at least one alternative data item; and associating at the server the at least one alternative data item with the user account.

2. The method of claim 1, further comprising providing the at least one alternative data item for selection via an output device.

3. The method of claim 1, further comprising associating the selection with an account identifier.

4. The method of claim 3, wherein the selection is received via a user account interface.

5. The method of claim 1, further comprising receiving a selected data item alternative from the user account.

6. The method of claim 1, further comprising associating the selected alternative data item with the user account.

7. A system for generating alternatives user identification information, comprising:

an input device that receives a data submission, the data submission for user identification associated with a user account and comprising one of a video file, an audio file, a multimedia, and a picture file that is employed to generate at least one of a visual or audible output that identifies the user account;

a processor that receives the data submission from the input device, determines at least one alternative data item for user identification associated with the user account, the alternative data item based on the data submission and employed to generate at least one of a visual or audible output that identifies the user account, outputs the at least one alternative data item, receives an indication of a selected one of the at least one alternative data item, and associates the at least one alternative data item with the user account.

8. The system of claim 7, wherein the input device comprises one of a keyboard, a hard drive, a diskette, a compact disk, a removable storage device, an infrared signal, and the Internet.

9. The system of claim 7, further comprising an output device that outputs the at least one alternative data item.

10. The system of claim 9, wherein the output device comprises one of a television, a computer monitor, a handheld mobile device, a cellular telephone, a personal digital assistant, a gaming console, a multimedia console, a watch, a home theater, and speakers.

11. A computer readable medium comprising computer instructions which when executed by a computing device causes the device to perform a method for generating user identification information, the method comprising:

receiving at a server a data submission, the data submission for user identification associated with a user account and comprising one of a video file, an audio file, a multimedia file, and a picture file that is employed to generate at least one of a visual or audible output that identifies the user account;

determining at the server at least one alternative data item for user identification associated with the user account and employed to generate at least one of a visual or audible output that identifies the user account, the alternative data item based on the data submission and selected to be viewable on a target medium;
outputting the at least one alternative data item;

receiving an indication of a selected one of the at least one alternative data item; and associating at the server the at least one alternative data item with the user account.

* * * * *